United States Patent [19]
Iwata et al.

[11] 4,084,169
[45] Apr. 11, 1978

[54] AUTOMATIC FILM ADVANCING SYSTEM

[75] Inventors: Hiroshi Iwata, Osaka; Katsuji Ishikawa, Higashi-Osaka, both of Japan

[73] Assignee: West Electric Company, Ltd., Osaka, Japan

[21] Appl. No.: 722,039

[22] Filed: Sep. 10, 1976

[30] Foreign Application Priority Data

Sep. 19, 1975 Japan .................................. 50-114140

[51] Int. Cl.² .............................................. G03B 1/18
[52] U.S. Cl. ...................................... 354/173; 354/206; 354/213
[58] Field of Search ................ 354/21, 171, 173, 212, 354/213, 202, 204, 206; 352/169, 175, 177

[56] References Cited
U.S. PATENT DOCUMENTS

| | | | |
|---|---|---|---|
| 3,568,584 | 3/1971 | Harvey | 354/204 X |
| 3,809,466 | 5/1974 | Kobayashi | 352/177 X |
| 3,891,312 | 6/1975 | Aizawa et al. | 354/173 X |
| 3,946,409 | 3/1976 | Toyoda | 354/173 |

*Primary Examiner*—L. T. Hix
*Assistant Examiner*—M. L. Gellner
*Attorney, Agent, or Firm*—Cushman, Darby & Cushman

[57] ABSTRACT

In an automatic film advancing system for a small sized camera, a breaking-off of undesirable overload current of a film advancing motor at the end of the film or at an accidental stop of the film advancing can be made by providing in the system:

a switching circuit which connects the motor to a power source in response to a closing of a shutter after a photographing, and a detector circuit which produces a signal to cause said switching circuit to break off the feeding of said current when the current continues longer than a preset length of time.

5 Claims, 3 Drawing Figures

AUTOMATIC FILM ADVANCING SYSTEM

BACKGROUND OF THE INVENTION

This invention relates to an improvement in an automatic film advancing system for a photographic camera, wherein the film is advanced by one frame immediately following each shutter closing after photographing.

Recently, small-sized cameras have widely used the so-called 110 type film. This film is contained in a small cartridge and has a series of perforations, each perforation engaging in turn with a sprocket inside the cartridge, a perforation being provided for each picture frame of 13mm × 17mm. Some of such cameras have been provided with an automatic film advancing system comprising a motor and a controlling circuit.

In the conventional automatic film advancing system, the controlling circuit switches on the motor feeding circuit upon closing of shutter blades after photographing, and switches off the motor feeding circuit when the film is advanced exactly by one frame to thereby stop the film advancing. The advance of film by one frame is detected by the motion of a lever of a switch in the controlling circuit, a moving end thereof being engaged to each of the perforations in turn. In such system, the switch is designed to be turned "off" when the moving end of the lever comes to a predetermined position. However, the 110 type film has no perforation at the end part of its roll. Therefore, if a user inadvertently continues to cause the film advancing in such end part of the roll, the moving end of the lever can not precisely come to the predetermined position.

Resultantly, the switch continues to be closed forever, thereby continuing to energize the motor. In such case, the motor current continues to flow notwithstanding the fact that film, and hence the motor, can not move. Therefore the motor is undesirably overloaded until the batteries are worn out, thereby possibly damaging the motor and wasting the batteries. Additionally, similar overcurrent in the stopped motor may occur when the film is accidentally caught.

SUMMARY OF THE INVENTION

Accordingly, the present invention relates to an improved film advancing system capable of automatically breaking off undesirable overload current of a film advancing motor at the end of film or following an accidental catch of the film.

DETAILED DESCRIPTION OF THE INVENTION

Figure 1:
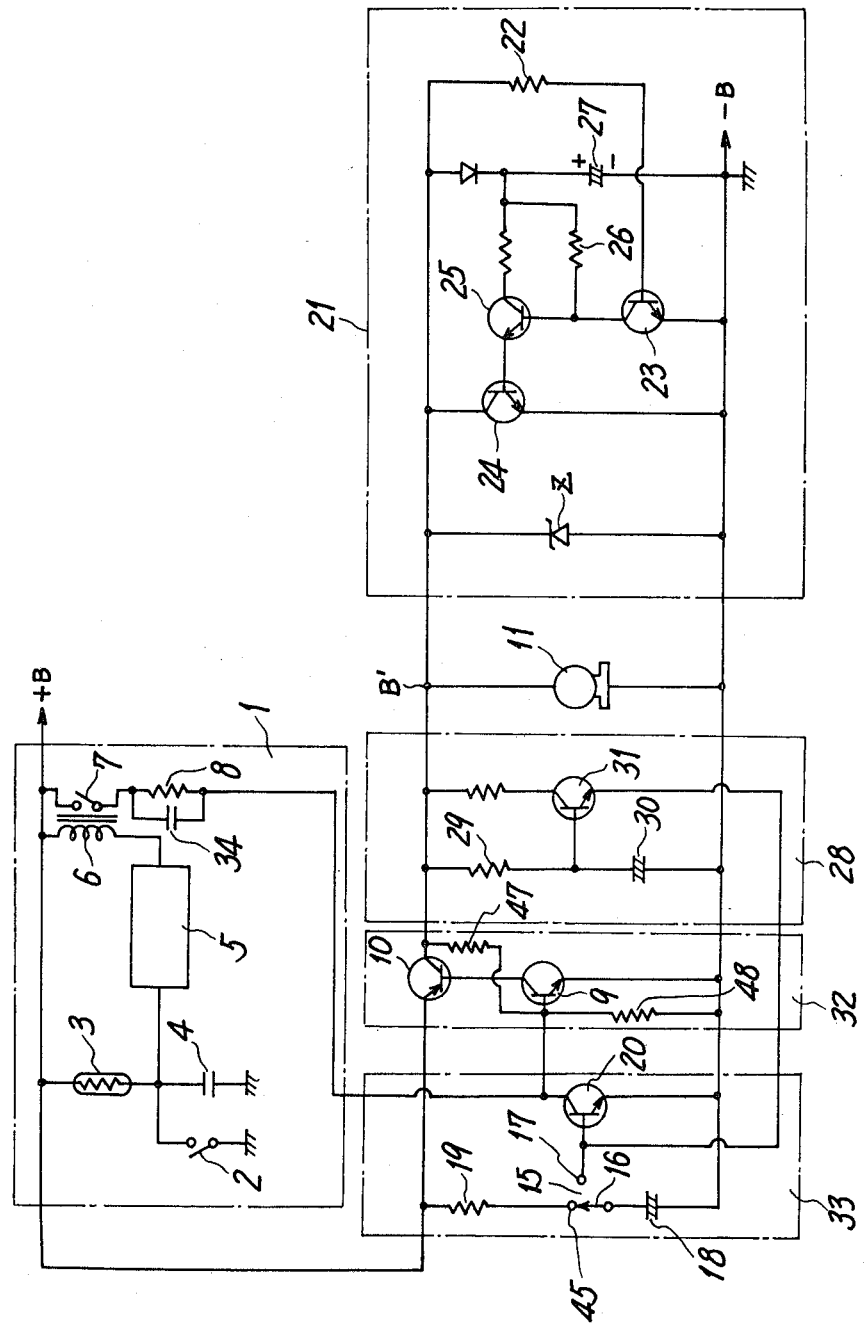
FIG. 1 is an circuit diagram embodying the present invention.
Figure 2A:
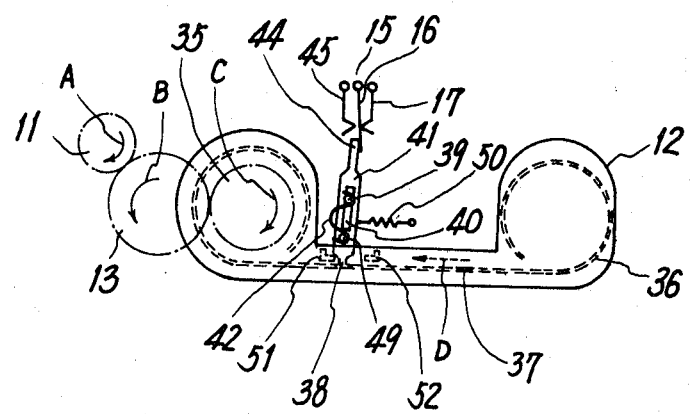
FIG. 2a is a plan view showing a film cartridge and a film-engaging switch in the state of the film being stopped.
Figure 2B:
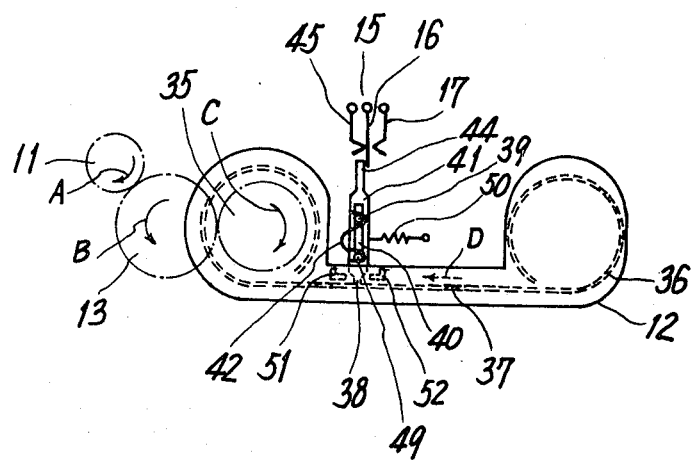
FIG. 2b is a plan view showing the cartridge and the film-engaging switch in the state of the film being moved.

In FIG. 1, which is a circuit diagram embodying the present invention, the circuit comprises a film advancing motor 11, a known timing circuit 1 which controls opening time period of shutter blades and also produces a delayed signal in response to closing of the shutter blades, a first switching circuit 32 for controlling current to the motor 11, a braking circuit 21 which brakes the motor 11 after the motor 11 is deenergized, a second switching circuit 33 which includes a switch 15 as a limit switch responsive to a sensing pawl 38 shown in FIGS. 2(a) and 2(b), to sense film motion and controls the first switching circuit 32, and a detecting circuit 28 which detects energization of the motor 11 beyond a predetermined length of time and produces a signal to stop the motor current.

In the timing circuit 1, a switch 2 is linked to a shutter mechanism in a manner so as to be opened simultaneously with the opening of shutter blades. Accordingly, a timing capacitor 4 begins to be charge by a current fed through a photoconductor 3 which receives a light from the photographic object. After a time related to the brightness of the photographic object, the voltage across the capacitor 4 reaches a preset level and therefore the switching circuit 5 is actuated to energize an electromagnet 6. The electromagnet has a member (not shown) to start the closing motion of the opened shutter as well as a switch 7 connected through a parallel connected resistor 8 and capacitor 34 to the first and the second switching circuits 32, 33. The switch 7 is closed when the electromagnet 6 is energized. Accordingly, almost simultaneously with the closing of the shutter, a D.C. pulse is fed to the base of a controlling transistor 9 of the first switching circuit 32.

In the second switching circuit 33, the base of the transistor 20 is connected to a first fixed contact 17 of the switch 15. A capacitor 18 is connected between the emitter of the transistor 20 (connected to a D.C. negative terminal −B) and a moving contact 16 of the switch 15. A resistor 19 is connected between the D.C. positive terminal +B and a second fixed contact 45 of the switch 15. The switch 15 is constituted in a manner that the moving contact 16 touches the first fixed contact 17 when the sensing pawl 38 comes to its extreme left position when the film advancing for one frame has been completed as shown in FIG. 2a, and the moving contact 16 touches the second fixed contact 45 when the sensing pawl 38 is in a range extending from an extreme right position at the beginning of the film advance to the proximity of the abovementioned extreme left position of the film shown in FIG. 2a. As shown in FIG. 2a and FIG. 2b, the sensing pawl 38 is pressed downward by a spring 42 onto the film 36, and hence is inserted in a perforation 37 on the film 36, which film is contained in a conventional cartridge 12 having an exposing window and a sprocket. The pawl-carrying lever 41 is pivoted by engaging a lengthwise slit 40 with a pin 39 in lengthwise slidable manner. The upper end of the lever 41 is disposed to engage the moving contact 16 of the switch 15. The lever 41 is also provided with a pulling spring 50, so as to be pulled back rightward when the sensing pawl 38 disengages from a perforation 37. This permits the pawl to be inserted in the next perforation. The left and right motion of the pawl 38 is limited by a pair of baffles 51 and 52, respectively.

In the first switching circuit 32, a switching element, for instance a transistor 10, is connected by its emitter to the D.C. positive terminal +B, by its collector to one terminal B' of the motor 11, and by its base to the collector of the controlling transistor 9. The emitter of the controlling transistor 9 is connected to the D.C. negative terminal −B and the base of the transistor 9 is connected commonly to the collector of the transistor 20, to the resistor 8 and capacitor 34 of the timing circuit 1, and to a voltage dividing point of a voltage dividing circuit formed by resistors 47 and 48 connected in series across the ends of the motor 11.

The detecting circuit 28 comprises a timer circuit consisting of a resistor 29 and a capacitor 30 connected in series across the ends of the motor 11 and a transistor 31 connected at its base to the connecting point between said resistor 29 and the capacitor 30, at its collecter through a resistor to the terminal B' of the motor 11 and at its emitter to the base of the aforementioned transistor 20 of the second switching circuit 33.

The conventional motor braking circuit 21 comprises a zener diode Z connected across the ends of the motor 11, and three transistors 23, 24 and 25.

Ordinary Operation

When a release button (not shown) is pressed, the shutter blades open by a known mechanism, simultaneously opening the switch 2. Then, after a specified time related to the objective brightness, the electromagnet 6 is energized, thereby causing the shutter blades to close and simultaneously closing the switch 7. Therefore, a pulse is fed to the base of the transistor 9 through the capacitor 34, thereby turning the transistors 9 and 10 ON. Accordingly, the motor 11 is fed with D.C. current through the emitter-and-collector of the transistor 10 and the motor starts to rotate. As the film advances leftward as shown by arrow D in FIGS. 2a & 2b, the sensing pawl 38 of the switch 15 trips leftward. The time constant of the resistor 29 and the capacitor 30 is so selected to turn the transistor 31 ON after a specified time, for instance 5 seconds of charging, which time is selected to be sufficiently longer than one frame advancing time period for the film, which is about 1 second or so. Accordingly, until the pawl 38 comes to its extreme left position, the transistors 31 and 20 are not turned ON, thereby keeping the transistors 9 and 10 ON. During the film advancing, the moving contact 16 is touching the second contact 45, thereby causing the capacitor 18 to be charged by a current through the resistor 19.

When film advancing for one frame comes to its end, the pawl 38 arrives at its extreme left position, and therefore the switch 15 is changed over to engage the first fixed contact 17 as shown in FIG. 2a. Therefore, the charge in the capacitor 18 causes current flow through the base of the transistor 20, thereby turning it ON and hence turning the transistors 9 and 10 OFF. Thus the motor current fed from the terminals +B and −B stops. The capacitor 18 is selected to be rather small, so that the charge in the capacitor 18 is lost very quickly, and therefore the transistor 20 quickly turns OFF soon. However, since the transistor 10 is already OFF, the dividing point of the circuit, consisting of the resistors 47 and 48, is substantially at zero volt, and hence the transistor 10 is kept OFF. When the transistor 10 turns OFF, the D.C. voltage across the ends of the motor 11 becomes low, and therefore the base current of the transistor 23 is lost turning it OFF. Resultantly, a charge of the capacitor 27 is discharged through the resistor 26, the base and emitter of the transistor 25, and the base and emitter of the transistor 24, thereby turning the transistors 25 and 24 ON. By the ON state of the transistor 24, the motor 11 is strongly braked by the principle of dynamic braking and stops immediately. Consequently, the film advancing stops with the pawl 38 at its extreme left position. Incidentally, by a known shutter mechanism linked by gears 13, motor 11 etc., to the sprocket gear 35, during the period of the film advancing, the shutter is charged up for the next exposure, the switch 2 is restored to its Closed state, and the electromagnet 6 is restored to its deenergized state.

When the next shutter releasing occurs, by a closing of the switch 7 upon the shutter closing, again a D.C. pulse is sent to the base of the transistor 9. At this time the charge of the capacitor 18 has been already lost and therefore, the transistor 20 is in OFF state. Therefore the transistor 10 turns ON. Accordingly the motor 11 starts to rotate thereby further advancing the film leftward. As a result, the tip of the pawl 38, which is tilted and hence is likely to disengage from the perforation 37, leaves the perforation and comes back to extreme right position by means of the pulling spring 50, thereby restoring the moving contact 16 to contact with the second fixed contact 45.

In an Accident

When the user of the camera operates accidentally to advance the film beyond an end limit of the film, the part of the film without perforations 37 comes under the pawl 38. Therefore, in such unperforated film part the pawl slips on the smooth film face, and hence can not move leftward. Accordingly, the moving contact 16 of the switch continues to engage the second fixed contact 45, thereby keeping the motor 11 energized.

However, after a lapse of the preset time period of 5 seconds, because of charging of the capacitor 30, the transistor 31 switches "ON," and therefore the base of the transistor 20 receives base current through the collector-and-emitter circuit of the transistor 31. Resultantly, the transistors 9 and 10 turn OFF thereby stopping the motor current. Once the transistors 9 and 10 are OFF, the potential at the dividing point between the resistors 47 and 48 become zero volt as aforementioned, and accordingly the transistor 10 is kept OFF regardless of any change of base current of the transistor 20 thereafter.

When the film is accidentally caught and stops its advance, the same operation occurs to save the motor and battery.

This invention is also applicable to other types of cameras, for instance, manual exposure selection type etc., whenever the camera is provided with a signal generating means which is actuated by closing of the shutter and produces a signal to the base of the transistor 9 to turn the transistor 10 OFF.

We claim:
1. A film advancing system for a camera, comprising:
a film advancing motor adapted to be energized by current fed from a power source,
circuit means responsive to operation of a shutter of said camera for producing a control signal when said shutter closes following an exposure,
a first switching circuit responsive to said control signal for connecting said motor to the power source to thereby advance said film,
means for detecting a perforation on said film, said perforation detecting means being movable with said perforation as the film is advanced,
a second switching circuit operatively related to the first switching circuit and to the perforation detecting means whereby when said perforation detecting means is moved as a result of the film being advanced a predetermined amount, said second switching circuit controls the first switching circuit to interrupt the connection of the power source to the motor, a braking circuit joined to said motor and responsive to an interruption of the connection of the power source to the motor to brake said motor to thereby prevent excessive advancing of the film, and a detecting circuit responsive to energization of said motor and connected to said second switching means, said detecting circuit including timing means operative upon continuous energization of the film advancing motor for a length of time, in excess of that normally required to advance the film by said predetermined amount, to cause the detecting circuit to actuate the second switching circuit to in turn control the first switching circuit to interrupt the connection of the power source to the motor.

2. A film advancing system of claim 1, wherein said first switching circuit comprises a first transistor connected by its collector to said motor, by its emitter to one terminal of said power source and by its base to a collector of a second transistor which is connected by its emitter to the other terminal of said power source and by its base to an output terminal of said second switching circuit.

3. A film advancing system of claim 1, wherein said perforation detection means comprises a lever for actuating a limit switch included in said second switching means, pivoting means and a first spring means which cooperatively press a pawl at one end of said lever onto a face of said film for locating said pawl within the perforation, the lever being linked to actuate the switch when said pawl comes to a preset limit position with the film advanced by said predetermined amount, and a second spring urging said lever from said limit position in a direction opposite that in which the film is advanced.

4. A film advancing system of claim 1, wherein the second switching circuit comprises a limit switch joined to said perforation detecting means, a capacitor and a resistor connected in series across the power source with said limit switch in a first position prior to the film being advanced said predetermined amount, a transistor connected by its collector to said first switching circuit and having its base and emitter connected across the capacitor with said limit switch in a second position as a result of said film being advanced said predetermined amount, and means for connecting the control signal to said transistor.

5. A film advancing system of claim 4, wherein said timing means of the detecting circuit comprises a capacitor and a resistor connected in series across said motor, and a transistor joined between the connection point of the resistor and capacitor and the second switching circuit.

* * * * *